US006862066B2

(12) United States Patent
Oowaki et al.

(10) Patent No.: US 6,862,066 B2
(45) Date of Patent: Mar. 1, 2005

(54) DISPLAY DEVICE WITH CAPACITOR FORMED IN A REGION OF THE SUBSTRATE WHERE THE DRIVE CIRCUIT IS MOUNTED

(75) Inventors: Yoshio Oowaki, Mobara (JP); Masaaki Kitajima, Hitachioota (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 179 days.

(21) Appl. No.: 10/224,338

(22) Filed: Aug. 21, 2002

(65) Prior Publication Data

US 2003/0043331 A1 Mar. 6, 2003

(30) Foreign Application Priority Data

Aug. 29, 2001 (JP) ........................................ 2001-259066

(51) Int. Cl.[7] ...................... G02F 1/1343; G02F 1/1345
(52) U.S. Cl. .................... 349/139; 349/151; 349/149
(58) Field of Search ................................ 349/139, 151, 349/149, 80, 90, 87; 345/80, 90, 87

(56) References Cited

U.S. PATENT DOCUMENTS

| 5,870,163 | A | * | 2/1999 | Watanabe et al. | ............ 349/149 |
| 5,946,062 | A | * | 8/1999 | Hasegawa et al. | ............ 349/58 |
| 6,157,357 | A | * | 12/2000 | Kim | ............ 345/87 |
| 6,169,530 | B1 | * | 1/2001 | Mori et al. | ............ 345/93 |
| 6,266,119 | B1 | * | 7/2001 | Takahashi et al. | ............ 349/149 |
| 6,297,868 | B1 | * | 10/2001 | Takenaka et al. | ............ 349/151 |

FOREIGN PATENT DOCUMENTS

JP          2000-147557          5/2000

* cited by examiner

Primary Examiner—Tarifur R. Chowdhury
Assistant Examiner—Mike Qi
(74) Attorney, Agent, or Firm—Antonelli, Terry, Stout & Kraus, LLP

(57) ABSTRACT

To provide an image display device that is capable of preventing a malfunction of a drive circuit, while reducing the size of an outer frame of an image display device and achieving a sufficient EMI countermeasure, the image display device is provided with a drive circuit mounted in a region outside of a display portion on one of the opposing substrates and is connected to signal lines formed in a region of the display portion, wherein a capacitor is formed in the region of the substrate where the drive circuit is mounted.

8 Claims, 5 Drawing Sheets

DISPLAY DEVICE WITH CAPACITOR FORMED IN A REGION OF THE SUBSTRATE WHERE THE DRIVE CIRCUIT IS MOUNTED

BACKGROUND OF THE INVENTION

The present invention relates to an image display device.

An image display device, such as a liquid crystal display device of the active matrix type, has a plurality of pixel regions, such surrounded by two neighboring gate signal lines and two neighboring drain signal lines. The gate signal lines extend in the x-direction, and a plurality of the gate signal lines are spaced in parallel in the y-direction. The drain signal lines extend in the y-direction, and a plurality of the drain signal lines are provided in the x-direction. These signal lines are provided on the liquid crystal side of one of a pair of opposing transparent substrates, which have a liquid crystal material disposed therebetween.

In each pixel region, there is provided a switching element, that is activated by a scanning signal received from one of the neighboring gate signal lines, and a pixel electrode, that is supplied with an image signal from one of the neighboring drain signal lines through the switching element. The pixel electrode is arranged so that an electric field is generated between the pixel electrode and a counter electrode, that is formed on one of the opposing transparent substrates, so that the light transmission property of the liquid crystal can be controlled by the electric field.

Scanning line drive circuits connected to the gate signal lines and image signal drive circuits connected to the drain signal lines are mounted on the transparent substrate. For example, it is well known in the art to form such drive circuits from semiconductor devices using a face down bonding technique. In such a case, input signals to each of the semiconductor devices are fed from a wiring board (for example, a printed circuit board) that is arranged in the vicinity of the transparent substrate. The wiring board is provided with a bypass capacitor that is mounted between a power supply line and a ground pattern formed on the wiring board, so that a transient current necessary to operate each drive circuit is supplied by the bypass capacitor.

SUMMARY OF THE INVENTION

However, in an image display device having a configuration as described above, i.e. a liquid crystal display device, because of the long distance between the bypass capacitor on the wiring board and the drive circuit, a momentary shortage of current supply is often caused by the inductance L of the wiring, which results in a malfunction of the drive circuit.

In addition, mounting the capacitor on the wiring board places a limit on the possible size-reduction of the wiring board and prevents a reduction in the size of the so-called outer frame (the region between the outline of the display portion and the outline of the display device).

Furthermore, in recent years, a type of drive circuit configuration has been developed in which a plurality of adjacent drive circuits are connected by wiring to each other in order to transfer data in each drive circuit to the next adjacent drive circuit. Thus, a countermeasure against EMI caused by the wiring is necessary in the case of a very high resolution type display device.

Accordingly, it is an object of the present invention to provide an image display device which can prevent malfunctions in the drive circuits.

It is another object of the present invention to provide an image display device in which it is possible to reduce the size of the so-called outer frame.

It is a still further object of the present invention to provide an image display device which has a sufficient EMI countermeasure.

Among the disclosed aspects according to the present invention, some typical configurations will be briefly described below.

That is to say, an image display device according to the invention comprises a plurality of drive circuits mounted in a region outside of an image display portion on one of a pair of opposing transparent substrates having a liquid crystal material disposed therebetween, wherein the drive circuits are connected to signal lines formed in the liquid crystal display portion, a capacitor is formed in the region where the drive circuit is mounted on the transparent substrate, and one of the electrodes of the capacitor is connected to a terminal for connection to a power supply terminal and a terminal of the drive circuit, while the other electrode thereof is connected to a connection to a ground terminal of the drive circuit.

Another image display device according to the invention comprises at least one substrate forming an image display device, and a drive circuit is formed on the substrate and is connected to signal lines formed in a display portion of the image display device, wherein a capacitor is formed in the region of the substrate where the drive circuit is mounted.

The image display device having the configuration as described above includes a bypass capacitor that is formed in the region where the drive circuit is mounted, which bypass capacitor supplies a transient current to the drive circuit when the drive circuit is operated. Thus, by forming the bypass capacitor very close to the drive circuit, the influences of the inductance L factor caused by the wiring can be largely reduced. Consequently, a momentary current can be supplied to the drive circuit in order to prevent a malfunction of the drive circuit.

Other objects and features of the invention will become apparent from the following description of various embodiments with reference to the accompanying drawings.

BRIEF DESCRIPTION OF THE DRAWINGS

In order to more fully understand the drawings, which will be referred to in the detailed description of the present invention, a brief description of each figure of the drawings is provided.

DESCRIPTION OF THE PREFERRED EMBODIMENTS

Preferred embodiments of the image display device according to the present invention will be explained with reference to a liquid crystal display device.

EXAMPLE 1

(Equivalent Circuit)

Figure 2:
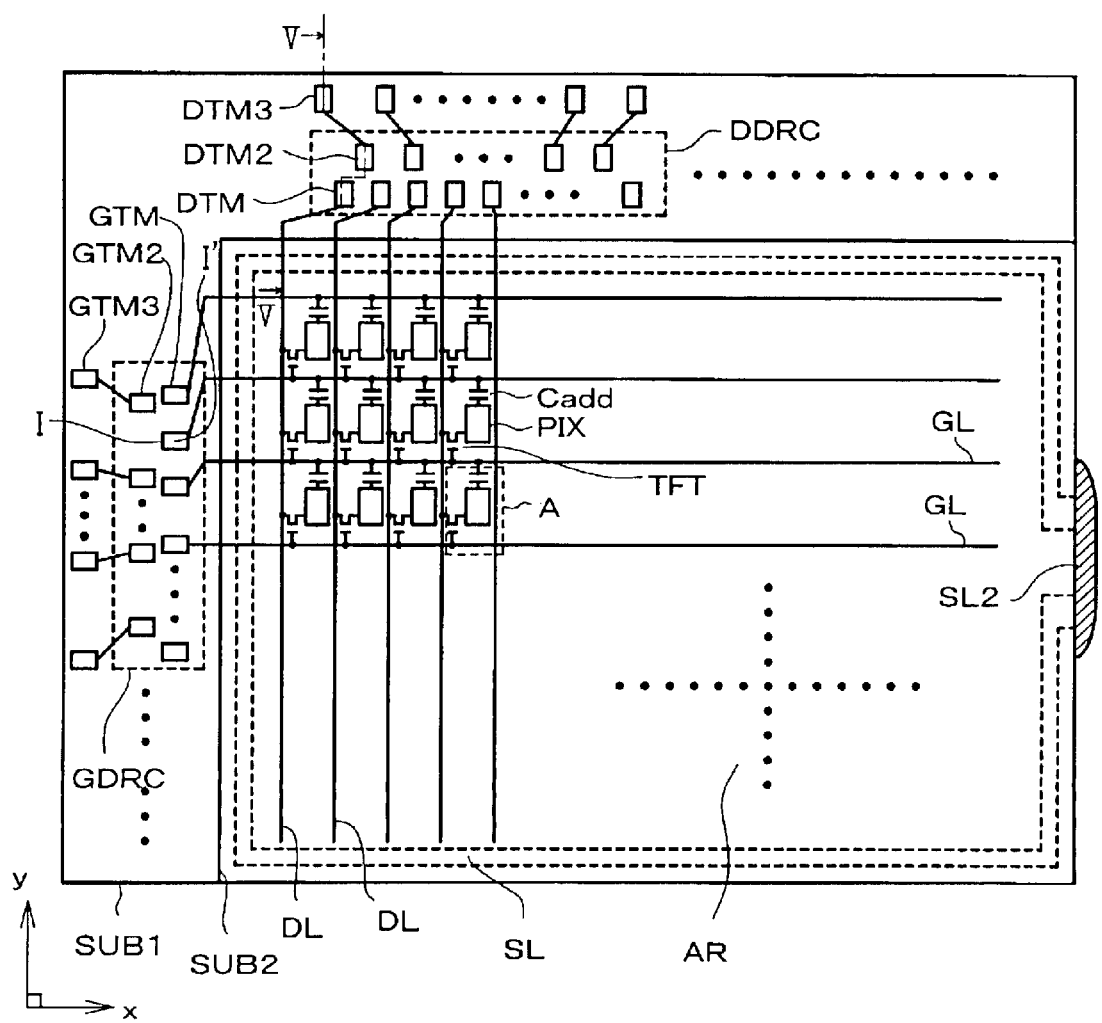
FIG. 2 is a schematic circuit diagram showing an example of the construction and layout of an image display device according to the present invention.

FIG. 2 is an equivalent circuit diagram showing an example of a liquid crystal display device according to the present invention. The circuit diagram shown in FIG. 2 is represented in accordance with the actual geometry of the liquid crystal display device.

In FIG. 2, a transparent substrate SUB1 is arranged in opposition to a transparent substrate SUB2, and a liquid crystal material is interposed therebetween.

On a liquid crystal side of the transparent substrate SUB1, a plurality of gate signal lines GL extend in the x-direction, as seen in FIG. 2, and they are disposed in parallel with each other in the y-direction; and, a plurality of drain signal lines DL, which are insulated from the gate signal lines GL, extend in the y-direction, and they are disposed in parallel with each other in the x-direction. A display part AR is formed by an array of pixel regions, each of which is a substantially rectangular region surrounded by respective signal lines.

A thin film transistor TFT, that is driven by a scanning signal (voltage) fed through one of the neighboring gate signal lines GL, and a pixel electrode PIX, that is fed with an image signal (voltage) through one of the neighboring drain signal lines via the thin film transistor TFT, are formed in each pixel region.

A capacitor element Cadd is formed between the pixel electrode PIX and the other gate signal line GL, that is adjacent to the gate signal line GL which feeds the scanning signal, and the capacitor element Cadd stores the image signal fed to the pixel electrode PIX for a long period when the thin film transistor TFT is turned off.

A counter electrode CT (not shown) is formed in common to each pixel region on the liquid crystal side surface of the transparent substrate SUB2, and the liquid crystal material is interposed between the opposing substrates SUB1 and SUB2. An electric field is selectively generated between the counter electrode CT and the pixel electrode PIX in each pixel region, so that the light transmission property of the liquid crystal material between the electrodes is controlled.

One end of each gate signal line GL is extended to one side of the transparent substrate SUB1 (the left side as seen in FIG. 2). Terminals GTM are formed in this extended region of the gate signal lines GL, and these terminals are connected to bumps of a semiconductor integrated circuit GDRC, which includes vertical scanning circuits. The semiconductor integrated circuit GDRC is mounted on the transparent substrate SUB1. One end of each drain signal line DL is also extended to one side of the transparent substrate SUB1 (the upper side as seen in FIG. 2), and terminals DTM are formed in this extended region of the drain signal lines DL and are connected to bumps of a semiconductor integrated circuit DDRC, which includes image signal drive circuits. The semiconductor integrated circuit DDRC is mounted on the transparent substrate SUB1.

Each of the semiconductor integrated circuits GDRC and DDRC is completely mounted on the transparent substrate SUB1 using a so-called COG (chip on glass) technique. Each of the bumps on the input sides of the semiconductor integrated circuits GDRC and DDRC is also connected to individual terminals GTM2 and DTM2 formed on the transparent substrate SUB1, respectively, while the terminals GTM2 and DTM2 are connected to respective terminals GTM3 and DTM3 arranged in the closest portion to an edge of the transparent substrate SUB1 through each wiring layer.

Figure 5:
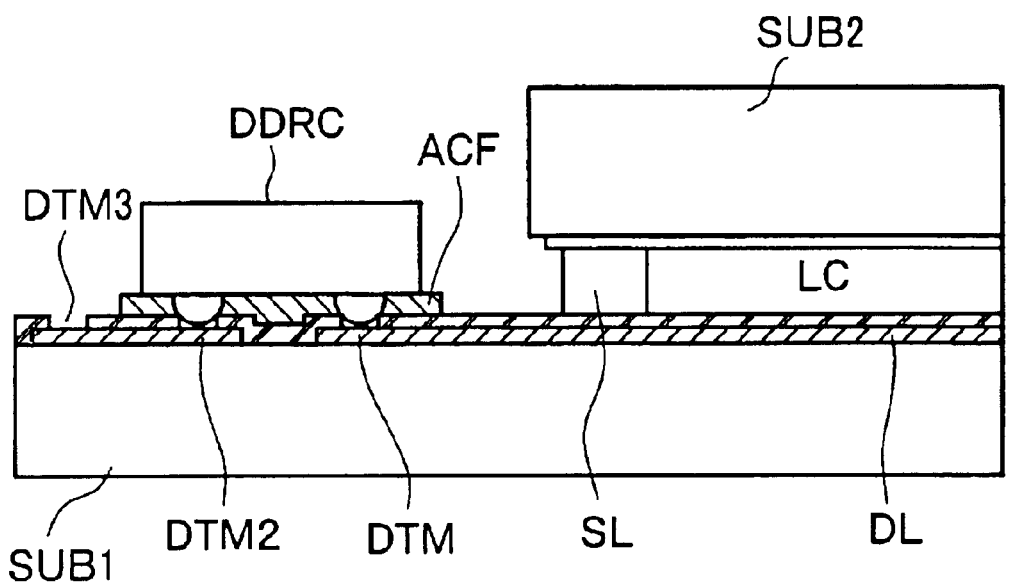
FIG. 5 is a cross-sectional view taken on line V—V of FIG. 2.

FIG. 5 shows a cross-sectional view taken on line V—V in FIG. 2. In FIG. 5, each bump of the semiconductor integrated circuit DDRC is connected to respective terminals DTM and DTM2 via an anisotropic conductive film ACF.

The characteristics of the COG technique make it possible for the bumps on the output sides of the semiconductor integrated circuits GDRC and DDRC to be formed with a very short distance to each other; and, therefore, both the terminals GTM of the gate signal lines GL and terminals DTM of the drain signal lines DL are formed with quite a short distance to each other. Consequently, the contact space for each terminal GTM of the gate signal lines GL and each terminal DTM of the drain signal lines DL, as well as each bump on the output sides of the semiconductor integrated circuits GDRC and DDRC, is so small that an increase in the contact resistance between the bumps and the terminals GTM and DTM cannot be neglected.

The transparent substrate SUB2 is arranged to oppose the transparent substrate SUB1, while avoiding the region where the semiconductor integrated circuits are mounted, and so it is smaller than the transparent substrate SUB1. The transparent substrate SUB2 is fixed to the transparent substrate SUB1 by sealing material SL formed along the periphery of the transparent substrate SUB2, and the sealing material SL also performs the function of sealing the liquid crystal LC between the transparent substrates SUB1 and SUB2.

(Configuration of a Pixel)

Figure 3:
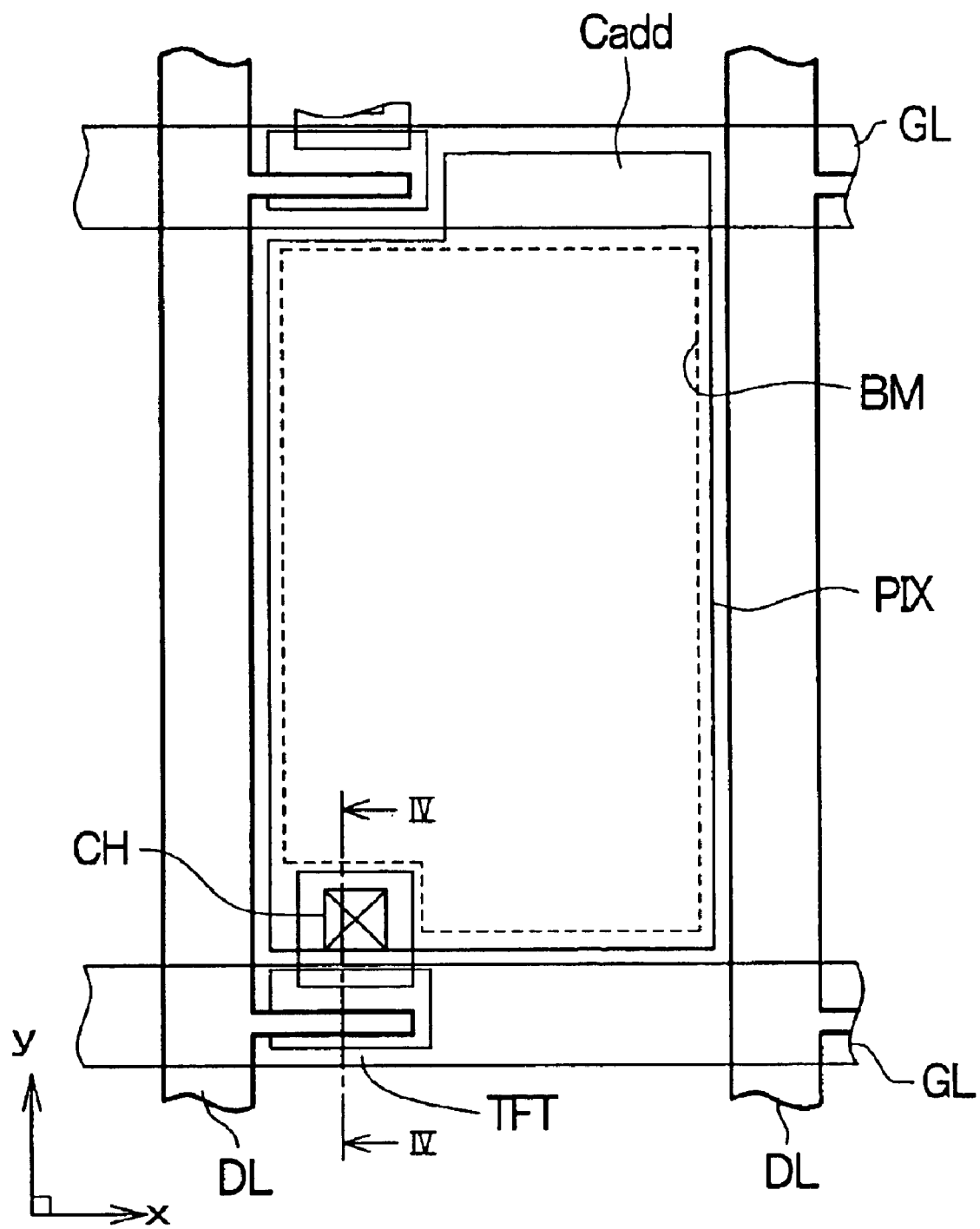
FIG. 3 is a plan view showing an example of the construction of a pixel in an image display device according to the present invention.
Figure 4:
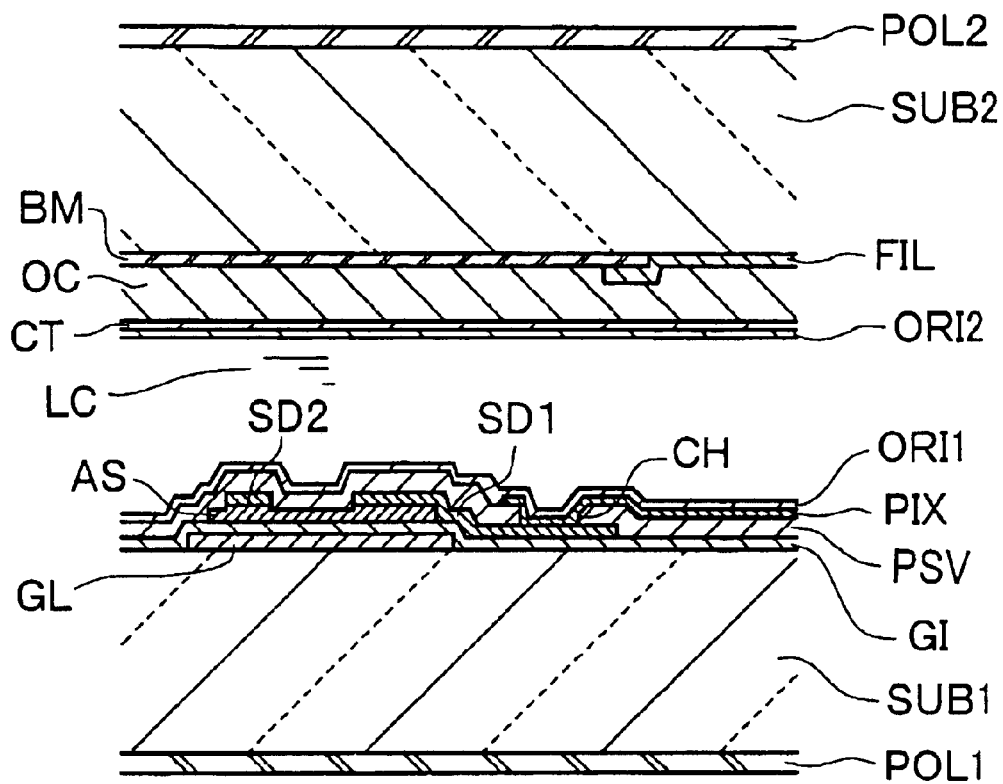
FIG. 4 is a cross-sectional view taken on line IV—IV of FIG. 3.

FIG. 3 is a plan view showing the configuration of a typical pixel portion formed on the transparent substrate SUB1, and it corresponds to the part shown by a dotted line frame A in FIG. 2. FIG. 4 is a cross-sectional view taken on line IV—IV in FIG. 3, and it also shows a cross-sectional view of the transparent substrate SUB2.

In FIG. 3, the gate signal lines GL are formed on a liquid crystal side surface of the transparent substrate SUB1, each extending in the x-direction and being parallel with each other in the y-direction. The gate signal line GL, in this example, has a double-layer structure, an upper layer of which is made of alloys of Al and Nd (such alloys are represented by Al—Nd, hereinafter), and a lower layer of which is made of alloys of Mo and Zr (such alloys are represented by Mo—Zr, hereinafter). The double-layer structure is employed because it can largely reduce the resistance and be formed to have a cross-section exhibiting a forward tapered shape in the process for selective etching.

Furthermore, an insulating film GI made of SiN, for example, is formed on the surface of the liquid crystal side of the transparent substrate SUB1, including the upper surface of the gate signal lines GL, as seen in FIG. 4. The insulating film GI serves to insulate the gate signal line GL from the drain signal line DL, to be described later, and it also serves as an interlayer insulating film for the thin film transistor TFT, to be described in detail below, and as a dielectric film for the capacitance element Cadd, which also will be described in detail below.

In a lower left portion of the pixel region, a semiconductor layer AS, formed of an i-type semiconductor (an intrinsic semiconductor a semiconductor undoped conductive impurities) made of a-Si, for example, is formed so as to overlap with the gate signal line GL. A source electrode and a drain electrode are formed on the upper surface of the semiconductor layer AS, so that the semiconductor layer of an MIS type of a thin film transistor TFT, having a part of the gate signal line GL as a gate electrode is obtained. The source electrode SD1 and the drain electrode SD2 in the thin film transistor TFT, as well as the drain signal line DL formed on the insulating layer GI, are formed at one time.

The drain signal lines OL each extend in the y-direction and are disposed in parallel with each other in the x-direction, as seen in FIG. 3, and a part of each drain signal line DL is extended up to the surface of the semiconductor layer AS in order to cause the extended part to form the drain electrode SD2 of the thin film transistor TFT. At the same time, an electrode formed separately from the drain electrode SD2 becomes the source electrode SD1. The source electrode SD1 is connected to the pixel electrode PIX, to be described in detail below, and the pattern of the source electrode SD1 has a portion slightly extending toward the center of the pixel region in order to provide a connecting area.

In an interface among the drain electrode SD2, the source electrode SD1 and the semiconductor layer AS, a semiconductor layer doped with impurities is formed so as to serve as a contact layer. The thin semiconductor layer doped with impurities near the surface of the semiconductor layer AS is formed after the formation of the semiconductor layer AS, and after the drain electrode SD2 and the source electrode SD1 are formed, and then an exposed region of the semiconductor layer doped with impurities is etched by using the electrodes as a mask in order to obtain the configuration described above.

Then, a protecting film PSV, which is made of SiN, for example, is formed over the surface of th transparent substrate SUB1, including the drain signal lines DL (the drain electrode SD2, the source electrode SD1). The protecting film PSV is arranged to avoid direct contact between the thin film transistor TFT and the liquid crystal LC, and a contact hole CH is formed to expose a part of the extended portion of the source electrode SD1 in the thin film transistor TFT.

The transparent pixel electrode PIX, which is made of ITO (Indium-Tin-Oxide), for example, is formed on an upper surface of the protecting film PSV, covering substantially all of the pixel regions. Since the pixel electrode PIX is formed so as to cover and extend into the contact hole CH of the protecting film PSV, the pixel electrode PIX is connected to the source electrode SD1 in the thin film transistor TFT. In addition, an alignment film ORI1 is formed to cover the surface of the transparent substrate SUB1 on which the pixel electrode PIX is thus formed. The alignment film ORI1 is made of a resin, for example, and surface alignment of the alignment film ORI1 is created by rubbing in a specific direction. The alignment film ORI1 is arranged to contact the liquid crystal LC so that the direction of initial alignment of liquid crystal molecules in the liquid crystal LC is determined by the alignment film ORI1.

A polarizing plate POLL is clad on an opposite surface of the transparent substrate SUB1.

On the other hand, a black matrix BM, dividing each pixel region, is formed on the liquid crystal side surface of the transparent substrate SUB2. The black matrix BM is arranged to prevent external light from irradiating the thin film transistor TFT, which serves to improve the contrast of the display.

Furthermore, a respective color filter FIL, having a color corresponding to each pixel region, is formed in each aperture (a region where light transmits and a substantial pixel region) of the black matrix BM. In the arrangement of the color filters FIL, a filter of the same color is adopted for each pixel region provided in the y-direction, and a red filter (R), a green filter (G) and a blue filter (B) are arrayed in turn for each pixel region in the x-direction.

A planarization film OC, which is made of a resin, is applied to the surface of the transparent substrate SUB2, on which the black matrix BM and the color filters FIL are formed as described, covering the black matrix BM and the color filters FIL. The planarization film OC eliminates the steps otherwise created by the black matrix BM and the color filters FIL on the surface of the transparent substrate SUB2.

A counter electrode CT, which is made of an ITO film, for example, is commonly formed in each pixel region on the surface of the planerization film OC. An electric field corresponding to the image signal (voltage) is generated between the counter electrode CT and the pixel electrode PIX in each pixel region in order to control the direction of alignment of the liquid crystal LC that is interposed between these electrodes, and an appropriate combination of the polarizing plate POLL described above and a polarizing plate POL2 to be described later permits the light transmission property of the liquid crystal LC to controlled.

On the surface of the transparent substrate SUB2, on which the counter electrode CT is thus formed, an alignment film OR12 is formed so as to cover the counter electrode CT as well. The alignment film OR12 is made of a resin, for example, and it has a surface rubbed in a specific direction. The alignment film OR12 is arranged to contact the liquid crystal LC so that the direction of the initial alignment of the liquid crystal molecules in the liquid crystal LC is determined by the alignment film OR12.

A polarizing plate POL2 is cladded on an opposite side surface of the transparent substrate SUB2.

The pixel region configuration is changeable according to the type of image display device, and so it is to be understood that other structures of the pixel region are also to be included in this invention.

(Configuration in the Region where the Semiconductor Integrated Circuit DDRC is Mounted)

Figure 1A:
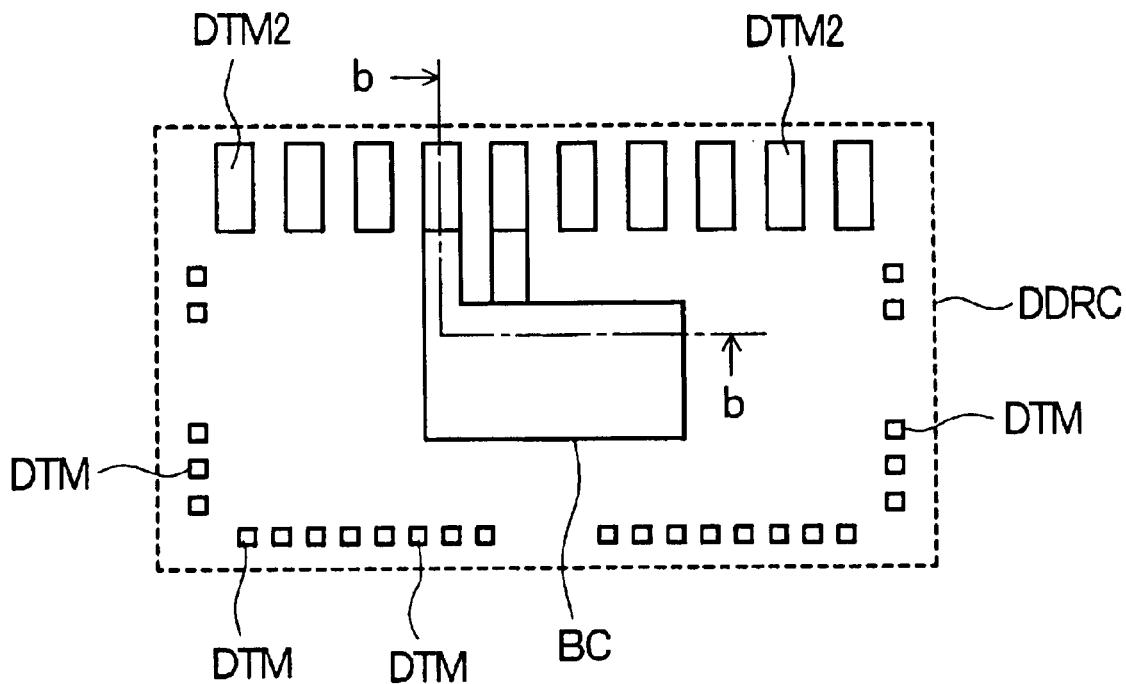
FIGS. 1A and 1B are schematic diagrams showing a top plan view and a sectional view taken along line b—b in FIG. 1A, respectively, of an example of an image display device according to the present invention.
Figure 1B:
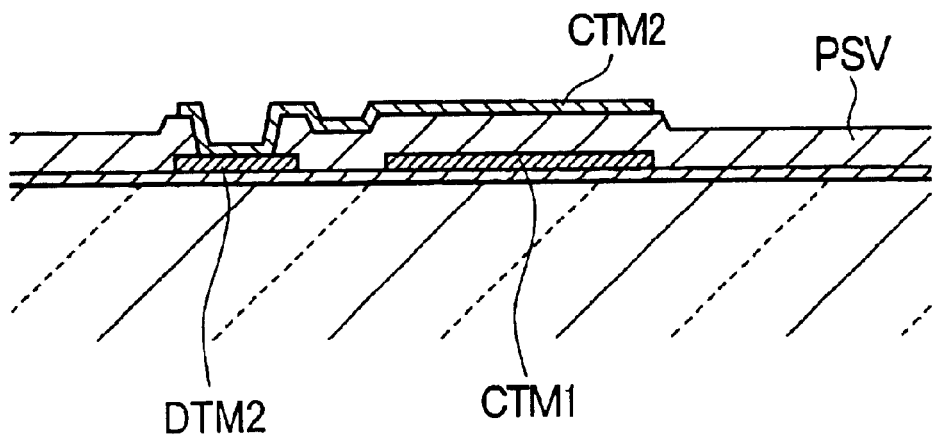

FIGS. 1A and 1B are schematic diagrams showing in detail a region where the semiconductor integrated circuit DDRC, including the image signal drive circuit, is mounted, in which FIG. 1A is a plan view, and FIG. 1B is a cross-sectional view taken on line b—b in FIG. 1A.

As shown in FIG. 1A, in the region where the semiconductor integrated circuit DDRC is mounted, the terminals DTM2 are formed on one side of the region, to be connected to input bumps of the semiconductor integrated circuit DDRC, and the terminals DTM are formed on the other side of the region, to be connected to output bumps of the semiconductor integrated circuit DDRC.

In FIG. 1A, the number of terminals DTM2 is smaller than the number of terminals DTM, and, accordingly, the area of the terminal DTM2 is larger than that of the terminal DTM. The terminal DTM is formed as an edge of an extended portion of the drain signal line DL and is made of the same material as the drain signal line DL.

A bypass capacitor BC is formed in the region where the semiconductor integrated circuit DDRC is mounted, more correctly, in a region surrounded by the terminals DTM2 and the terminals DTM. One of the electrodes CTM1 of the bypass capacitor BC is made of the same material as the drain signal line DL (CTM1 and the drain signal line DL are formed at one time in this example). The insulating film GI and the protecting film PSV in the liquid crystal display portion AR extend to the region where the semiconductor integrated circuit DDRC is mounted, and the protecting film PSV (a dielectric film) is interposed between the electrodes of the bypass capacitor BC. The other electrode CTM2 of the bypass capacitor BC is made of the same material as the pixel electrode PIX (CTM2 and the pixel electrode PIX are formed at one time in this example).

The electrode CTM1 of the bypass capacitor is formed by extending a selected terminal serving as a ground terminal in the terminals DTM2, while a part of the other electrode CTM2 is formed by overlapping a selected terminal serving as a power supply terminal in the terminals DTM2.

The protecting film PSV covering each terminal DTM2, which is made of the same material as the drain signal line DL, is opened through a hole in order to expose each terminal DTM2, and each exposed surface of the terminals DTM2 is arranged to be covered with the same material (ITO) as the pixel electrode PIX. By coating each of the terminals DTM2 and the terminals DTM with ITO, creation of electrolytic corrosion is avoided.

In the image display device having a configuration as described in this example, because the bypass capacitor BC is close to the image signal drive circuit, including the semiconductor integrated circuit DDRC (because the bypass capacitor BC is just below the image signal drive circuit), the L (inductance) of the wiring of the bypass capacitor BC becomes small, which allows momentary supply of the current to the image signal drive circuit. Consequently, a malfunction of the image signal drive circuit can be prevented.

Furthermore, by use of the configuration described above, it is not necessary to mount the bypass capacitor BC on the wiring board, so that the wiring board can be formed so as to be small, and, therefor, the so-called outer frame in the liquid crystal display device can be reduced in size.

The configuration of the region on which one of the image signal drive circuits is mounted has been described in the above-mentioned example, however, other regions provided with other image signal drive circuits are of the same configuration as the region shown in FIGS. 1A and 1B. Needless to say, the above-described configuration is not limited to the image signal drive circuits, but the same configuration can also be applied to the scanning signal drive circuits.

It is to be noted that the formation of the bypass capacitor BC in the regions of the image signal drive circuit and/or the scanning signal drive circuit is also applicable to the other examples described below.

EXAMPLE 2

Figure 6:
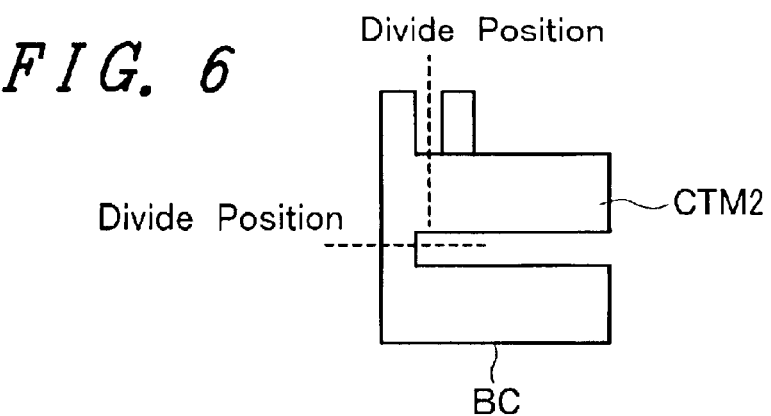
FIG. 6 is a schematic diagram showing another example of an image display device according to the present invention.

FIG. 6 is a schematic diagram of another example of an image display device according to the invention, showing an electrode pattern of the bypass capacitor BC shown in FIG. 1A.

For example, when a pin hole created in a dielectric film between the electrode CTM1 in the lower layer and the electrode CTM2 in the upper layer causes them to short circuit, the short circuit portion can be cut off from the remaining electrode pattern by using a laser beam, for example, in order to recover from the short circuit, as shown in FIG. 6.

It is desirable, for this purpose, for the pattern of the bypass capacitor BC to be arranged to have a terminal portion (the terminal connected to the bump of the semiconductor integrated circuit, including the image signal drive circuit) as a trunk and a plurality of branch portions extending from the trunk portion (the example shown in FIG. 6 also has the pattern described above).

EXAMPLE 3

Figure 7:
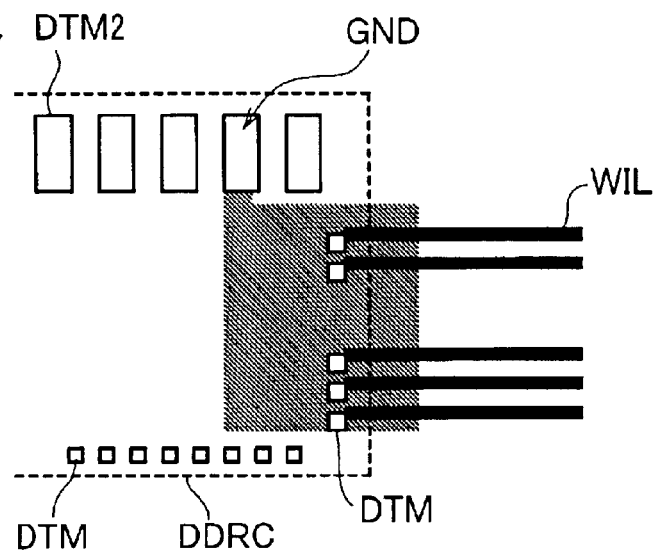
FIG. 7 is a schematic diagram showing still another example of an image display device according to the present invention.

FIG. 7 is a schematic diagram of still another example of an image display device according to the invention.

FIG. 7 shows one of a plurality of regions where the semiconductor integrated circuit DDRC, including the image signal drive circuit, is mounted. Each semiconductor integrated circuit DDRC is connected to adjacent semiconductor integrated circuits DDRC on the transparent substrate SUB1 through a plurality of wiring layers WIL. Each wiring layer WIL is arranged to transmit data from one semiconductor integrated circuit DDRC to another semiconductor integrated circuit DDRC.

Among a plurality of terminals DTM2 connected to the input bump of the semiconductor integrated circuit DDRC, an extended portion of a ground (GND) terminal is formed to reach both the terminals of the wiring layer WIL and an area where the wiring layerWIL is formed. In this example, the extended portion from the ground (GND) terminal is formed in a different layer from the wiring layer WIL and may be formed on an upper or lower layer with respect to each wiring layer WIL, when a dielectric film, such as the insulating film GI, the protecting film PSV or a laminated material made of these films, exists between the layer of the extended portion from the ground (GND) terminal and the wiring layer WIL.

Consequently, an EMI countermeasure against an electromagnetic wave generated from the wiring layer WIL can be realized without securing a specific space for an EMI countermeasure.

EXAMPLE 4

Figure 8:
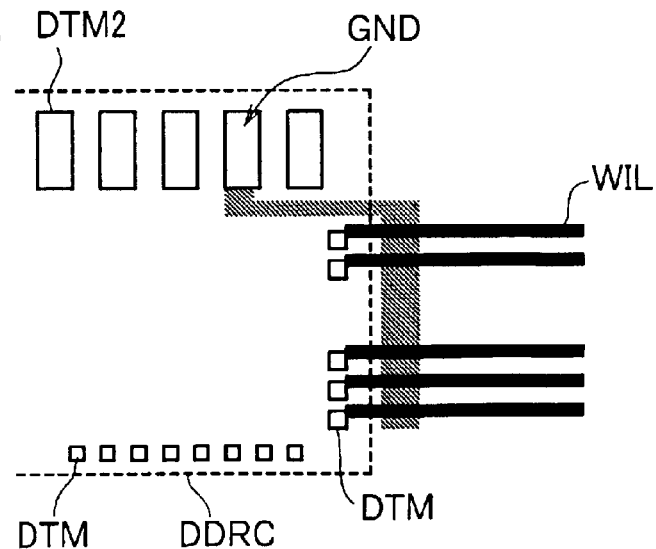
FIG. 8 is a schematic diagram showing yet another example of an image display device according to the present invention.

FIG. 8 is a schematic diagram of an even further example of a image display device according to the invention, and it is similar to the arrangement of FIG. 7. One difference compared to the arrangement of FIG. 7 is that an extended portion from the ground (GND) terminal connected to the input bump of the semiconductor integrated circuit DORC is formed in a relatively small area of a region where the semiconductor integrated circuit DDRC is mounted and serves only as a simple leader line to the extended portion formed on the wiring layer WIL portion.

However, even in this case, an EMI countermeasure against an electromagnetic wave generated from the wiring layer WIL can be performed well.

In the above-described examples according to the invention, the liquid crystal display device has a liquid crystal drive system, in which the pixel electrode on one transparent substrate and the counter electrode on the other transparent substrate are arranged to generate an electric field therebetween, and the liquid crystal is driven by an electric field that is substantially perpendicular to the transparent substrates. However, the above examples according to the invention are also applicable to a liquid crystal display device having a liquid crystal drive system in which the pixel electrode and the counter electrode are arranged on the same transparent substrate, and in which the liquid crystal is driven by an electric field extending substantially in parallel with the transparent substrates.

The same problem has been created in both types of the liquid crystal display device because the image signal drive circuit and the scanning signal drive circuit in both types of the liquid crystal display device have completely the same configuration.

The configuration according to the invention can be applied to various types of image display device, including a liquid crystal display device, an organic electroluminescent display, a plasma display, an electric paper and other image display devices.

As explained above, the invention provides an image display device that is capable of preventing a malfunction of a drive circuit, is capable of reducing the area of an outer frame in an image display device, and is capable of achieving a sufficient EMI countermeasure.

What is claimed is:

1. A liquid crystal display device comprising a drive circuit IC mounted in a region outside of a liquid crystal display portion on one of a pair of opposing substrates which have a liquid crystal material disposed therebetween, said drive circuit IC being connected to signal lines formed in the liquid crystal display portion, wherein a capacitor is formed in the region of the substrate where the drive circuit IC is mounted, and the capacitor arranged below the drive circuit IC and between the drive circuit IC and the region of the substrate where the drive circuit IC is mounted.

2. A liquid crystal display device comprising a drive circuit IC mounted in a region outside of a liquid crystal display portion on one of a pair of opposing substrates which have a liquid crystal material disposed therebetween, said drive circuit IC being connected to signal lines formed in the liquid crystal display portion, wherein a capacitor is formed in the region of the substrate where the drive circuit IC is mounted, and the capacitor arranged below the drive circuit IC and between the drive circuit IC and the region of the substrate where the drive circuit IC is mounted, and one of the electrodes of the capacitor is connected to a terminal for connection to a power supply terminal of the drive circuit IC and the other electrode of the capacitor is connected to a terminal for connection to a ground terminal of the drive circuit IC.

3. A liquid crystal display device comprising a drive circuit mounted in a region outside of a liquid crystal display portion on one of a pair of opposing substrates which have a liquid crystal material disposed therebetween, said drive circuit being connected to signal lines formed in the liquid crystal display portion, wherein a capacitor formed in the region of the substrate where the drive circuit is mounted, wherein one of the electrodes of the capacitor is connected to a terminal for connection to a power supply terminal of the drive circuit, and the other electrode of the capacitor is connected to a terminal for connection to a ground terminal of the drive circuit, and each electrode of the capacitor forms a pattern having a trunk portion connected to the power supply terminal or the ground terminal, and a plurality of branch portions which extend from the trunk portion.

4. A liquid crystal display device comprising a plurality of drive circuit ICs mounted in a region outside of a liquid crystal display portion on one of a pair of opposing substrates with a liquid crystal material disposed therebetween, said drive circuit ICs being connected to signal lines formed in the liquid crystal display portion, wherein the signal lines each extend in one direction and are parallel with each other in a direction crossing the one direction in which the signal lines extend, and one drive circuit IC is allocated to a plurality of the signal lines disposed adjacent to each other, each adjacent drive circuit IC is connected through a wiring layer formed on the substrate, the wiring layer is formed via an insulating film in a region where a conductive layer is formed, conductive layer is connected to a terminal for connection to a ground terminal of the drive circuit IC, and a capacitor is formed in the region of the substrate where at least one of the drive circuit ICs is mounted, the capacitor being arranged below the at least one of the drive circuit ICs and between the at least one of the drive circuit ICs and the region of the substrate where the drive circuit IC is mounted.

5. An image display device, comprising:
at least one substrate; and
a drive circuit IC mounted on the substrate and connected to signal lines formed in a display portion of the image display device, wherein a capacitor is formed in a region of the substrate where the drive circuit IC is mounted, the capacitor being arranged below the drive circuit IC and between the drive circuit IC and the region of the substrate where the drive circuit IC is mounted.

6. An image display device, comprising:
at least one substrate; and
a drive circuit IC mounted on the substrate and connected to signal lines formed in a display portion of the image display device;
wherein a capacitor is formed in a region of the substrate where the drive circuit IC is mounted, the capacitor being arranged below the drive circuit IC and between the drive circuit IC and the region of the substrate where the drive circuit IC is mounted, and
one of the electrodes of the capacitor is connected to a terminal for connection to a power supply terminal of the drive circuit IC, and the other electrode of the capacitor is connected to a terminal for connection to a ground terminal of the drive circuit IC.

7. An image display device, comprising:
at least one substrate; and
a drive circuit mounted on the substrate and connected to signal lines formed in a display portion of the image display device;
wherein a capacitor is formed in a region of the substrate where the drive circuit is mounted,
one of the electrodes of the capacitor is connected to a terminal for connection to a power supply terminal of the drive circuit, and the other electrode of the capacitor is connected to a terminal for connection to a ground terminal of the drive circuit, and
each electrode of the capacitor forms a pattern having a trunk portion connected to the power supply terminal or the ground terminal, and a plurality of branch portions which extend from the trunk portion.

8. An image display device, comprising:
at least one substrate; and
a plurality of drive circuit ICs mounted on the substrate and connected to signal lines formed in a display section of the image display device;
wherein the signal lines each extend in one direction and are parallel with each other in a direction crossing the one direction in which the signal lines extend,
one drive circuit IC is allocated to a plurality of the signal lines disposed adjacent to each other, each adjacent drive circuit IC is connected through a wiring layer formed on the substrate, and the wiring layer is formed via an insulating film in a region where a conductive layer is formed, and the conductive layer is connected to a terminal for connection to a ground terminal of the drive circuit IC, and
a capacitor is formed in the region of the substrate where at least one of the drive circuit ICs is mounted, the capacitor being arranged below the at least one of the drive circuit ICs and between the at least one of the drive circuit ICs and the region of the substrate where the drive circuit IC is mounted.

* * * * *